US011911945B2

(12) United States Patent
Kubo et al.

(10) Patent No.: US 11,911,945 B2
(45) Date of Patent: Feb. 27, 2024

(54) INJECTION MOLDING MACHINE AND INJECTION MOLDING METHOD

(71) Applicant: Sodick Co., Ltd., Kanagawa (JP)

(72) Inventors: Yoshikazu Kubo, Kanagawa (JP); Hisakazu Araki, Kanagawa (JP); Koichi Hirota, Kanagawa (JP); Kenzo Akiyama, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 119 days.

(21) Appl. No.: 17/378,776

(22) Filed: Jul. 19, 2021

(65) Prior Publication Data
US 2022/0016818 A1    Jan. 20, 2022

(30) Foreign Application Priority Data
Jul. 20, 2020 (JP) .................................. 2020-123670

(51) Int. Cl.
*B29C 45/54*    (2006.01)
*B29C 45/46*    (2006.01)

(52) U.S. Cl.
CPC ............ *B29C 45/54* (2013.01); *B29C 45/461* (2013.01); *B29C 2045/547* (2013.01)

(58) Field of Classification Search
CPC .......................... B29C 45/54; B29C 2045/547
See application file for complete search history.

(56) References Cited

U.S. PATENT DOCUMENTS

| 5,499,915 | A | * | 3/1996 | Fujita | ..................... B29C 45/54 |
| | | | | | 425/557 |
| 10,926,436 | B2 | | 2/2021 | Nobuta et al. | |
| 2009/0311358 | A1 | * | 12/2009 | Sawa | ..................... B29C 45/48 |
| | | | | | 425/148 |
| 2017/0312954 | A1 | * | 11/2017 | Nobuta | ............... B29C 45/0005 |
| 2018/0133940 | A1 | * | 5/2018 | Yokoyama | .......... B29C 45/2737 |

FOREIGN PATENT DOCUMENTS

| CN | 107856261 | A | * | 3/2018 | ........... B29C 45/531 |
| JP | 60135224 | A | * | 7/1985 | ............. B29C 45/50 |
| JP | S60135224 | | | 7/1985 | |

(Continued)

OTHER PUBLICATIONS

Machine translation JPH06143345A (Year: 1994).*

(Continued)

*Primary Examiner* — Jacob T Minskey
*Assistant Examiner* — Wayne K. Swier
(74) *Attorney, Agent, or Firm* — JCIPRNET

(57) ABSTRACT

Provided are an injection molding machine and an injection molding method. An injection molding machine includes: a plasticizing unit which rotates a screw to plasticize a molding material inside a plastication cylinder, and an injection unit. The injection unit has: a plunger reciprocally moving inside an injection chamber, and an injection driving device reciprocally moving the plunger. By driving the injection driving device to move the plunger backward and forward inside the injection chamber, and driving a rotary driving device to alternately rotate the screw in a normal rotation direction and a reverse rotation direction, the molding material is controlled to reciprocate between the plastication cylinder and the injection chamber.

6 Claims, 10 Drawing Sheets

(56) References Cited

FOREIGN PATENT DOCUMENTS

| | | | | | |
|---|---|---|---|---|---|
| JP | 06143345 A | * | 5/1994 | ......... | B29C 45/1753 |
| JP | 6126719 | | 5/2017 | | |
| JP | 2020059204 | | 4/2020 | | |
| JP | 6719634 | | 7/2020 | | |

OTHER PUBLICATIONS

Machine translation JPS60135224A (Year: 1985).*
Machine translation CN107856261A (Year: 2018).*
Yoshikazu Kubo, "Injection Device and Gas Dissolution Method of Injection Device", Unpublished U.S. Appl. No. 17/080,865, filed Oct. 27, 2020.

* cited by examiner

INJECTION MOLDING MACHINE AND INJECTION MOLDING METHOD

CROSS-REFERENCE TO RELATED APPLICATION

This application claims the priority benefit of Japan application serial NO. 2020-123670, filed on Jul. 20, 2020. The entirety of the above-mentioned patent application is hereby incorporated by reference herein and made a part of this specification.

BACKGROUND

Technical Field

The disclosure relates to a screw preplasticating injection molding machine in which a plasticizing unit is separated from an injection unit, and particularly relates to an injection molding machine and an injection molding method of the injection molding machine.

Related Art

As one of the injection devices included in an injection molding machine, conventionally, for example, as disclosed in Patent literature 3, a so-called screw preplasticating injection device is known in which a plasticizing unit and an injection unit are separately arranged. The plasticizing unit plasticizes a thermoplastic molding material by a plastication screw. The injection unit pushes the melted molding material plasticized in the plasticizing unit by an injection shaft, and injects the melted molding material from an injection cylinder into a mold. In addition, a screw preplasticating injection device is also known in which a mixing section and an injection unit are separately arranged. The mixing section mixes a thermosetting molding material with an additive by a mixing shaft or a static mixer. The injection unit pushes the liquid molding material mixed in the mixing section by the injection shaft, and injects the liquid molding material into a mold. As the injection shaft, for example, an injection plunger, an injection screw, or the like is used.

Recently, attention is drawn to a high-function plastic which overcomes problems of strength, heat resistance, and the like, which are weaknesses of general-purpose plastics. The high-function plastic is formed from a thermoplastic resin which is referred to as super engineering plastic having high strength, heat resistance, sliding property, low wear, lightweight, chemical resistance, and the like. Due to the extremely high functionality, products obtained by injection molding using the super engineering plastic as a molding material are used in many fields such as industrial products, healthcare, advanced industrial components, and the like. In addition, conventionally, it is also actively carried out that products with high functionality and high strength are manufactured by adding a plasticizer, a filling material, a coloring agent, a reinforcement, or other compounding agents to a thermoplastic resin raw material, mixing the above components as a molding material, and injection-molding the molding material.

However, due to high melt temperature and high melt viscosity of the high filling compounding resin composition, plasticization is extremely difficult for high filling compounding resin composition which contains a large number of filling materials such as a thermoplastic resin, a reinforcing fiber, or the like of liquid-crystal polymer type, polyphenylene sulfide type, or the like being the type of the super engineering plastic. Furthermore, the resin composition is difficult to be uniformly molded by normal extrusion molding or injection molding.

In addition, when a compounding agent such as the coloring agent or the like is introduced as a masterbatch pellet into an injection molding machine together with a desirable thermoplastic resin to manufacture a predetermined molded product, if kneading with the thermoplastic resin is insufficient, problems are caused such as non-uniform plasticization, color unevenness of the molded product, and the like. Thus, various efforts are taken in order to improve a problem that injection molding of a hard-to-mold resin is difficult or a problem that dispersive mixing of the compounding agent to thermoplastic resin is insufficient.

Patent literature 1 discloses an injection molding machine which is an invention equipped with a torpedo and a plurality of balls inside an injection cylinder, and in which a pellet-shaped resin is pushed by a plunger and flows into a plurality of holes of the torpedo, and the resin is stirred and kneaded by rotation of the balls (paragraphs 0027 to 0029 in Patent literature 1).

Patent literature 2 discloses an injection molding method in which in a plasticization step, after the downstream side of a screw is filled with a melted resin, the screw is moved backward and rotated reversely and normally to stir a reinforcing fiber (paragraphs 0028 to 0029 in Patent literature 2, FIG. 3). Patent literature 2 describes that when the invention is applied to a plasticization device of a preplasticating injection molding machine, a structure and a control are required in which the plastication screw can move forward and move backward (paragraph 0061 in Patent literature 2).

Patent literature 3 discloses a structure in which when a resin to be molded by an injection molding method has high viscosity and is a hard-to-mold resin, a gas is dissolved in the hard-to-mold resin under high pressure to reduce the viscosity of the hard-to-mold resin, and the injection is performed.

LITERATURE OF RELATED ART

Patent Literature

[Patent literature 1] Japanese Patent Laid-Open No. 2020-059204
[Patent literature 2] Japanese Patent No. 6126719
[Patent literature 3] Japanese Patent Application No. 2020-103847

However, in the invention of Patent literature 1, an additional member is required in order to dispose a special stirring member such as the torpedo or the like inside the injection cylinder, and when the hard-to-mold resin or the like is not used, work of removing the stirring member from the inside of the injection cylinder is generated, and setting work will be complicated.

In addition, when the invention of Patent literature 2 is applied to a screw preplasticating injection device, a design change such as adding a structure for moving the plastication screw forward and backward is required, and a structure change is forced to be made in a preplasticating injection device conventionally used.

SUMMARY

According to an embodiment, the disclosure provides an injection molding machine and an injection molding method of the injection molding machine capable of easily improving kneading property of a thermoplastic resin without drastically changing a structure of an existing screw preplasticating injection device.

According to an embodiment, the injection molding machine of the disclosure includes: a plasticizing unit which plasticizes a molding material inside a plastication cylinder by the rotation of a screw; an injection unit which injects, into a mold, the molding material supplied into an injection chamber of an injection cylinder from the plasticizing unit; and an injection control section which controls the operation of the plasticizing unit and the injection unit. The plasticizing unit has a rotary driving device rotating the screw. The injection unit has a plunger reciprocally moving inside the injection chamber, and an injection driving device reciprocally moving the plunger. By driving the injection driving device to move the plunger backward and forward inside the injection chamber, and driving the rotary driving device to alternately rotate the screw in a normal rotation direction and a reverse rotation direction, the injection control section controls the molding material to reciprocate on a flow path from the inside of the plastication cylinder into the injection chamber.

In addition, according to an embodiment, the disclosure provides an injection molding method of an injection molding machine. The injection molding machine includes: a plasticizing unit which plasticizes a molding material inside a plastication cylinder by the rotation of a screw, and an injection unit having a plunger which reciprocally moves inside an injection chamber. The injection molding method of the injection molding machine performs: a metering step in which the screw is rotated in a normal rotation direction, the molding material is extruded from the plastication cylinder into the injection chamber, the plunger is moved backward, and then the plunger is stopped in a metering completion position; and a pushing-back step in which after the metering step, the screw is rotated in a reverse rotation direction, the plunger is moved forward, and the molding material is extruded from the inside of the injection chamber to the plastication cylinder. Here, the "screw" refers to a plastication screw in examples, and the "plunger" refers to an injection plunger in the examples.

According to an embodiment of the disclosure, in the plasticization metering step, the injection plunger repeatedly moves forward and backward, and the plastication screw alternately rotates in the normal rotation direction and the reverse rotation direction, and thereby the melted resin reciprocally moves on the flow path between the injection chamber and the plastication cylinder. By this drive control of the injection molding machine, plasticization melting of the melted resin can be promoted, the plastic resin and the compounding agent can be uniformly mixed, and the molding can be easily performed even if the hard-to-mold resin having high melt temperature and high melt viscosity is used.

The injection control section of the disclosure drives the rotary driving device to rotate the screw in the normal rotation direction, extrudes the molding material from the inside of the plastication cylinder into the injection chamber, moves the plunger backward, and stops the plunger in a metering completion position; and the injection control section of the disclosure drives the rotary driving device to rotate the screw in the reverse rotation direction, drives the injection driving device to move the plunger forward, and pushes back the molding material from the inside of the injection chamber into the plastication cylinder.

According to an embodiment of the disclosure, the structure of the existing screw preplasticating injection device is used to make the melted resin reciprocally move between the injection chamber and the plastication cylinder, and thus kneading property of the thermoplastic resin can be easily improved only by changing the method of drive control without changing the existing structure.

The injection control section of the disclosure performs, for a plurality of cycles, the rotation of the screw in the normal rotation direction and the reverse rotation direction and the backward movement and the forward movement of the plunger.

In addition, in the injection molding method of the disclosure, the metering step and the pushing-back step are performed for a plurality of cycles.

According to an embodiment of the disclosure, the rotation of the screw in the normal rotation direction and the reverse rotation direction and the backward movement and the forward movement of the plunger are performed for a plurality of times, and the metering step and the pushing-back step are repeated for a plurality of cycles, and thereby kneading property of the thermoplastic resin can be further improved.

The injection molding machine of the disclosure includes a porous plate on the flow path.

According to an embodiment of the disclosure, by arranging the porous plate on the flow path from the inside of the plastication cylinder to the injection chamber, the melted resin passes through the plurality of pores to reciprocally move, and thereby the melted resin is dispersed and stirred, and kneading property can be further improved.

According to the disclosure, in the plasticization metering step, the injection plunger repeatedly moves forward and backward, and furthermore, the plastication screw alternately rotates in the normal rotation direction and the reverse rotation direction. Thereby, the melted resin reciprocally moves between the injection chamber and the plastication cylinder, and the plasticization melting of the melted resin is promoted. By using the configuration described above, the plastic resin and the compounding agent can be uniformly mixed without drastically changing the structure of the existing screw preplasticating injection device, and the molding can be easily performed even if the hard-to-mold resin having high melt temperature and high melt viscosity is used.

DESCRIPTION OF THE EMBODIMENTS

Figure 1:
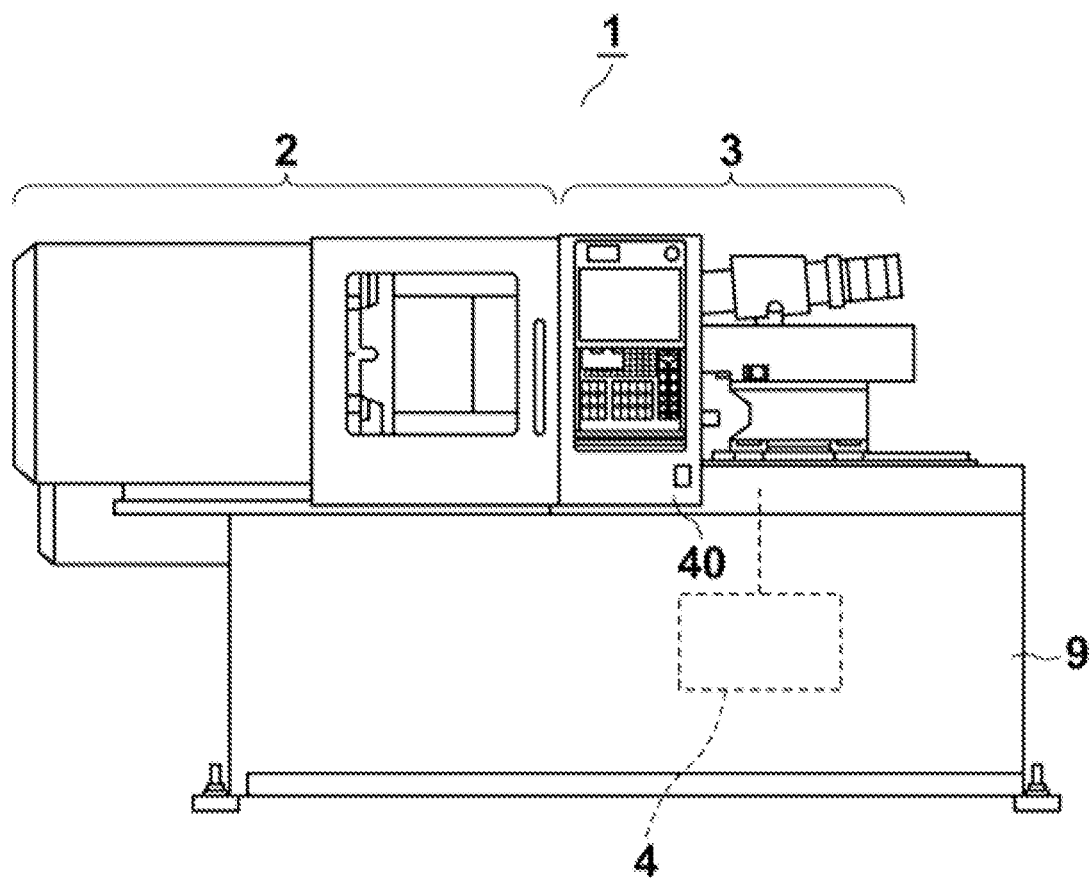
FIG. 1 is a schematic diagram showing an injection molding machine 1 in a first embodiment of the disclosure.

1. First Embodiment of the Disclosure (1.1 Overall Structure of Injection Molding Machine 1)
Hereinafter, an embodiment of the disclosure is described using the drawings. FIG. 1 is a schematic configuration diagram showing an injection molding machine 1 of the disclosure. In the injection molding machine 1 of the disclosure, a clamping device 2 and an injection device 3 are disposed on a machine base 9, the main body of a control device 4 is arranged inside the machine base 9, and an operating panel unit 40 of the control device 4 is arranged between the clamping device 2 and the injection device 3. In addition, the main body of the control device 4 may be arranged inside the operating panel unit 40.

The clamping device 2 has a mechanism for opening/closing a mold, and has a structure for applying sufficient pressure (clamping force) when the mold is filled with a resin material. In a way of making the pressure not lower than the pressure when the melted resin material enters the mold by applying the clamping force, the resin material is kept from flowing out of the mold. Meanwhile, the injection device 3 plasticizes and melts the resin material while heating, injects the melted resin at high pressure to fill a cavity space inside the mold mounted on the clamping device 2, cools and solidifies the melted resin inside the cavity space of the mold to obtain a molded product.

Figure 2:
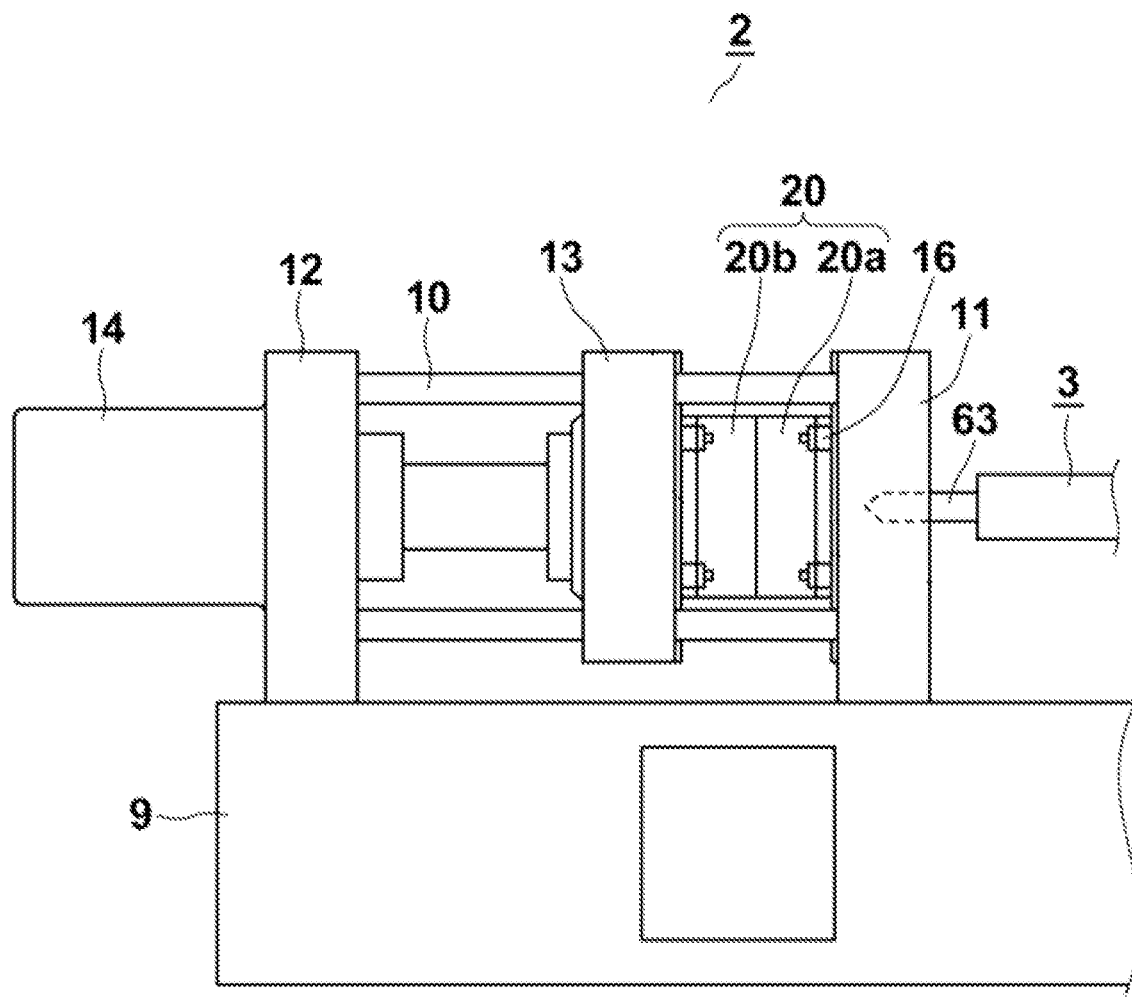
FIG. 2 is a schematic diagram showing a clamping device 2 of the injection molding machine 1 of the embodiment.

FIG. 2 is a schematic diagram of the clamping device 2 of the injection molding machine 1 in the embodiment of the disclosure.

The clamping device 2 includes, on the machine base 9, a fixed platen 11 and a back platen 12 connected by tie bars 10, a movable platen 13 moving between the fixed platen 11 and the back platen 12, and a clamping driving device 14 that moves the movable platen 13 forward/backward and presses the movable platen 13 with respect to the fixed platen 11. A fixed-side mold 20a of a mold 20 is attached to the fixed platen 11, and a movable-side mold 20b of the mold 20 is attached to the movable platen 13. The attachment of the mold 20 is performed in a way that the mold 20 is fastened and fixed to the fixed platen 11 side or the movable platen 13 side by a plurality of mold attachment members 16. The clamping driving device 14 is a device that moves the movable platen 13 forward/backward together with the movable-side mold 20b to open/close the mold and performs pressing to clamp the mold, and may be, for example, a hydraulic driven or electro-hydraulic driven direct-pressure clamping device, a toggle clamping device, or the like. The injection device 3 that plasticizes and injects the molding material is disposed on the fixed platen 11 side of the clamping device 2.

Figure 3:
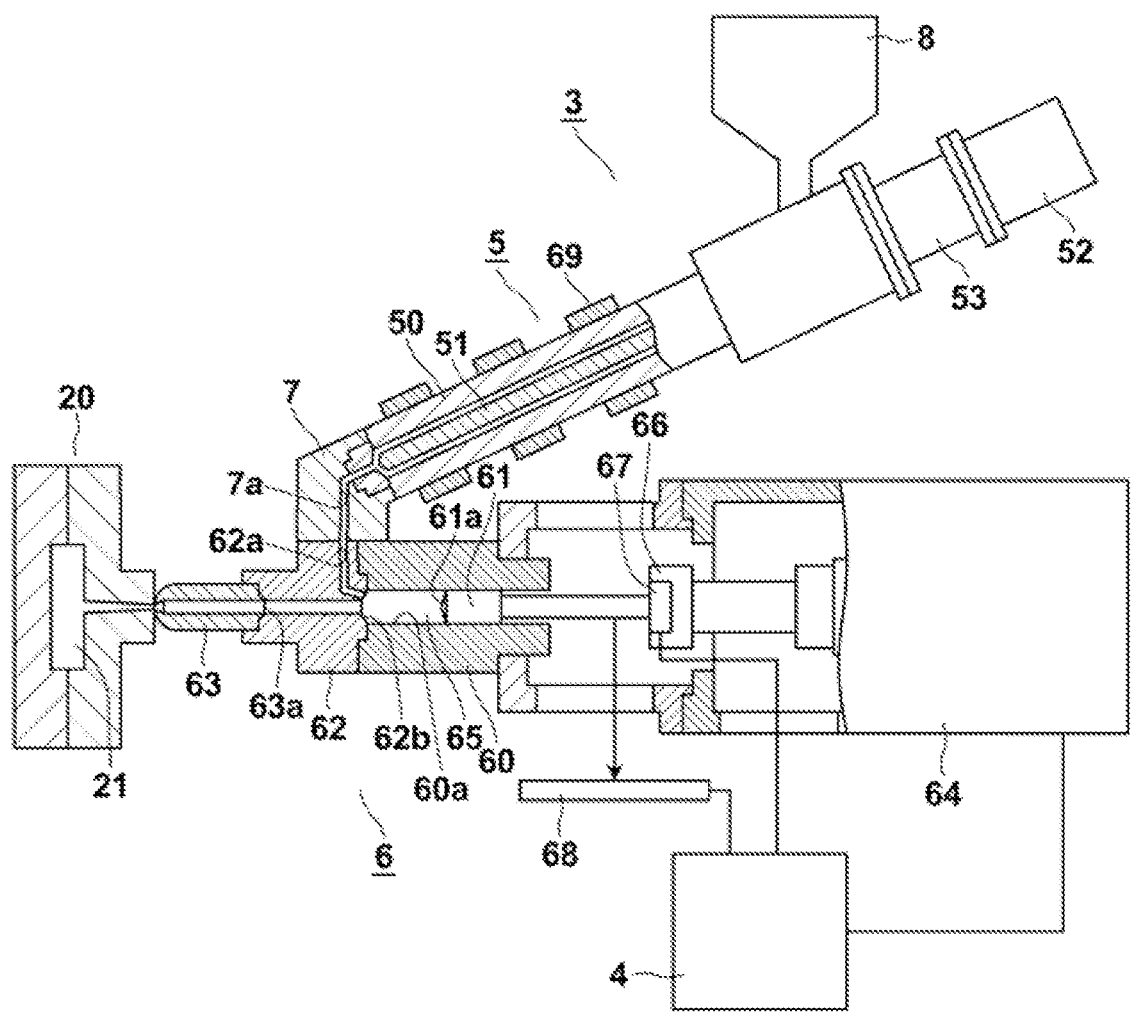
FIG. 3 is a schematic side view showing an injection device 3 of the injection molding machine 1 of the embodiment.
Figure 4:
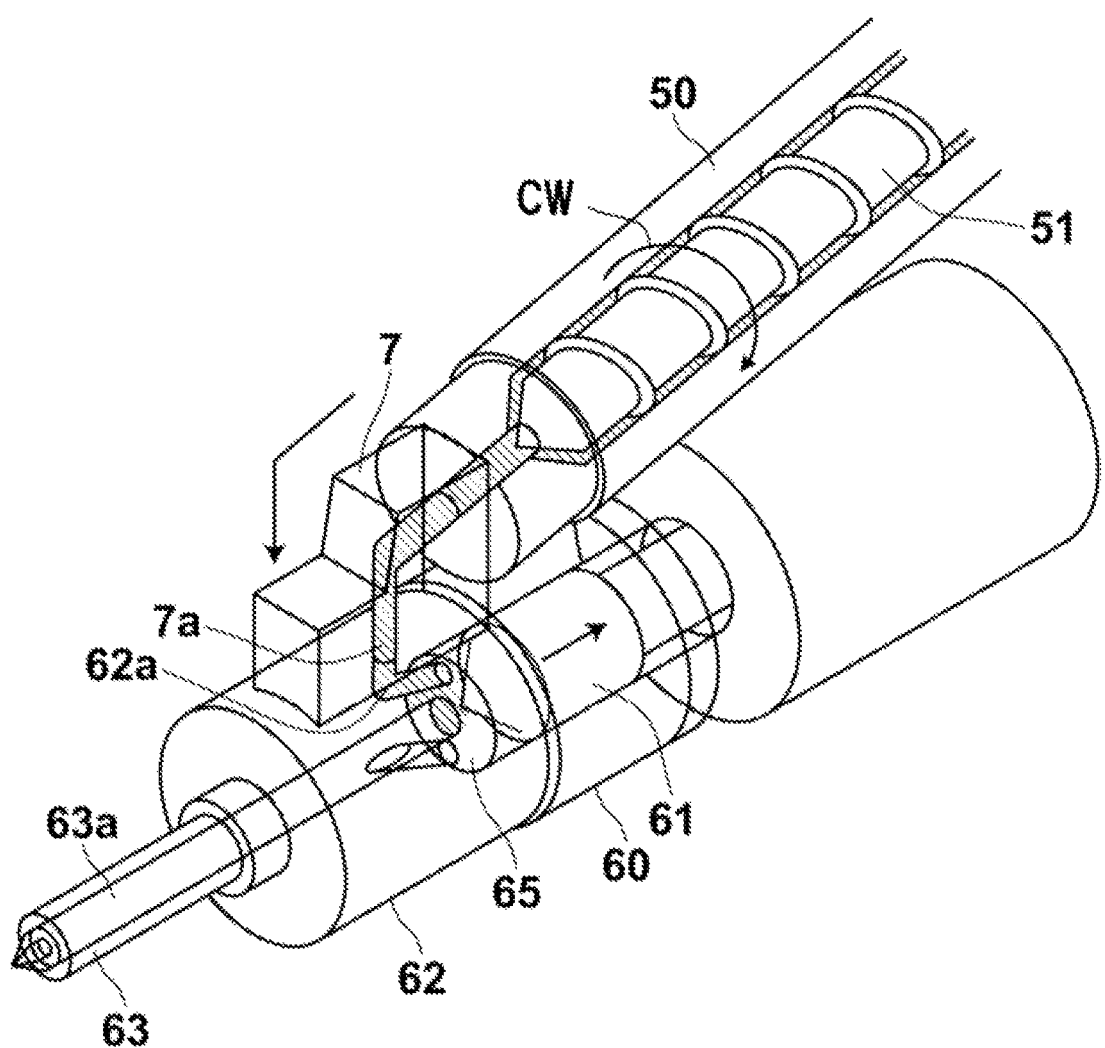
FIG. 4 is a schematic perspective view showing the injection device 3 of the injection molding machine 1 of the embodiment.

FIG. 3 is a schematic side view showing the injection device 3 of the injection molding machine 1 in the embodiment of the disclosure, and FIG. 4 is a schematic perspective view showing the injection device 3 of the injection molding machine 1 in the embodiment of the disclosure.

In the injection device 3, a plasticizing unit 5 that plasticizes and melts the resin material and an injection unit 6 that injects the melted resin to fill a cavity space 21 inside the mold 20 are separately arranged, and the plasticizing unit 5 and the injection unit 6 are linked by a connection member 7 having a communication path 7a for the melted resin.

The plasticizing unit 5 has: a plastication cylinder 50, a plastication screw 51 inside the plastication cylinder 50, a rotary driving device 52 that rotates the plastication screw 51, and a non-return driving device 53 that slightly moves the plastication screw 51 forward/backward. A hopper 8 is arranged for supplying the resin material from the rear-end side of the plastication cylinder 50.

The internal part of the plastication cylinder 50 is communicated with an injection chamber 65 of the injection unit 6 via the communication path 7a and a communication path 62a of the injection unit 6. An opening 7b of the communication path 7a on the plasticizing unit side is positioned on an axis of the plastication screw 51. A front end of the plastication screw 51 is formed in a sharp cone shape. If the rotary driving device 52 is driven, the plastication screw 51 rotates in a normal rotation direction CW (clockwise direction) or a reverse rotation direction CCW (counter-clockwise direction).

The non-return driving device 53 is arranged for preventing the molding material inside the injection chamber 65 from flowing back into the plastication cylinder 50 when pressure is applied inside the injection chamber 65 by an injection plunger 61 described later. As a specific configuration of the non-return driving device 53, for example, as shown in Japanese Patent No. 6281999, a configuration or the like can be used in which the plastication screw 51 is moved forward by a driving section such as a pneumatic cylinder or the like, and the opening 7b of the communication path 7a on the plasticizing unit side is closed by the front end of the plastication screw 51. In addition, the non-return driving device 53 is not limited to the configuration described above, and an opening/closing valve such as a check valve, a rotary valve, a needle valve, or the like closing the middle of the communication path 7a may be used.

The injection unit 6 has: an injection cylinder 60, the injection plunger 61 inside an injection cylinder hole 60a of the injection cylinder 60, an injection driving device 64 that moves the injection plunger 61 forward/backward, and an injection nozzle 63 attached to a front end of the injection cylinder 60 via a nozzle cylinder 62. On an end surface of the nozzle cylinder 62 on the injection cylinder 60 side, a front wall 62b is formed which has a shape substantially the same as that of a front end surface 61a of the injection plunger 61. The injection chamber 65 is formed as a space surrounded by the front wall 62b of the nozzle cylinder 62, the injection cylinder hole 60a of the injection cylinder 60, and the front end surface 61a of the injection plunger 61. Besides, in the injection chamber 65, the communication path 62a communicated with the inside of the plastication cylinder 50 via the communication path 7a of the connection member 7, and an injection hole 63a communicated to the front end of the injection nozzle 63 are open. A coupling 66 connects the injection plunger 61 and a driving rod of the injection driving device 64.

Various driving devices of the injection unit 6 are appropriately configured as a hydraulic type, a pneumatic type, an electric type, or the like.

Heating apparatuses 69 (hereinafter simply referred to as heaters) such as band heaters or the like are arranged on the outer periphery of the plastication cylinder 50, the injection cylinder 60, the nozzle cylinder 62, the connection member 7, the injection nozzle 63, and the like. For example, each cylinder is divided into a plurality of zones such as a front end part, an intermediate part, and a rear end part in an axial direction, and the heaters 69 are wound around each zone. In addition, the heaters 69 are also wound around the injection nozzle 63. For convenience, FIG. 3 shows a state in which the heaters 69 are wound around the plastication cylinder 50, but the heaters 69 are also wound around the injection cylinder 60, the nozzle cylinder 62, the connection member 7, and the injection nozzle 63. The molding material supplied from the hopper 8 to the plastication cylinder 50 is melted by the heating of the plastication cylinder 50 and the like that the heaters perform and shearing heating generated by the compression and the rotation of the plastication screw 51.

(1.2. Configuration of Control Device 4)

Figure 5:
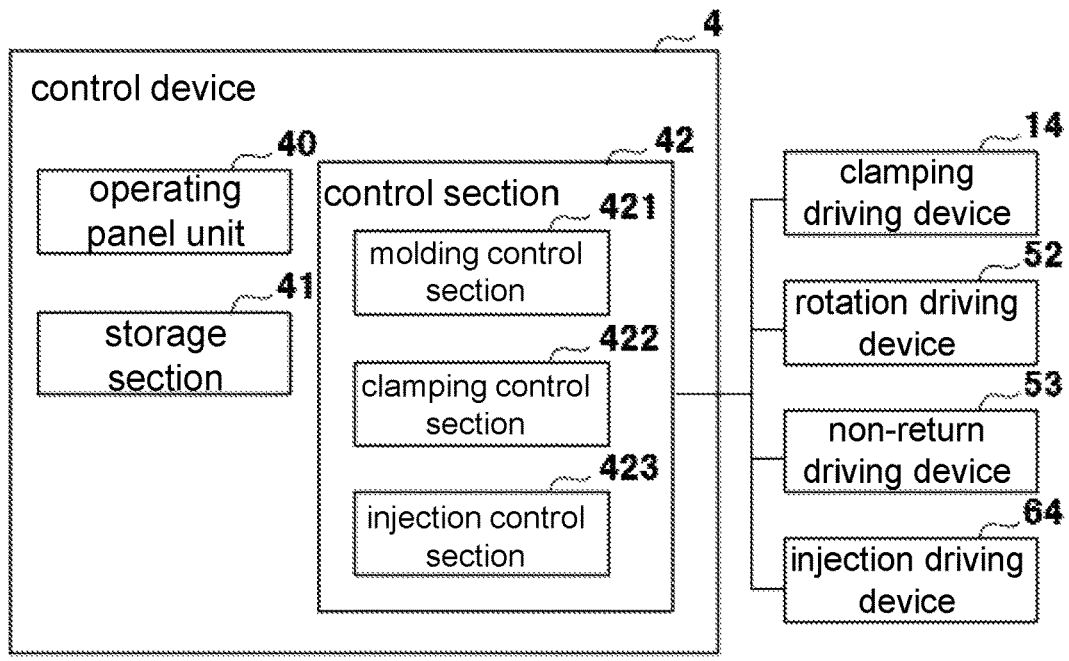
FIG. 5 is a block diagram showing a configuration of a control device 4 of the embodiment.

FIG. 5 is a block diagram showing a configuration of the control device 4 in the embodiment of the disclosure.

The control device 4 is equipped with the operating panel unit 40, and is configured by a storage device (storage section) 41 such as a hard disk or the like, a processing device including at least one Central Processing Unit (CPU) and a cache memory (secondary cache) disposed on a substrate, an additional random access memory (RAM) inserted in a dedicated slot, and a housing that accommodates one accessory component such as various interfaces.

In addition, a dedicated software is installed in the storage device 41 in addition to a basic software such as an operating system or the like and is executed by the CPU of the processing device, and thereby the control device 4 functions as a control section 42.

The control section 42 is equipped with: a clamping control section 422 for controlling the operation of the clamping device 2; an injection control section 423 for controlling the operation of the injection device 3; and a molding control section 421 for controlling the clamping device 2 and the injection device 3 by the clamping control section 422 and the injection control section 423 to perform the molding of the molded product in the order of mold closing, clamping, injection, pressure keeping, plasticization metering, mold opening, and removal.

The clamping control section 422 controls the clamping driving device 14 to move the movable platen 13 forward/backward together with the movable-side mold 20*b* to open/close the mold, and to further increase the pressure to a predetermined clamping force after the close contact of the molds 20*a* and 20*b* closed in a mold step.

The injection control section 423 reads an actual detection value of a position detection device which is used for successively detecting a position to which the injection plunger 61 moves and a speed at which the injection plunger 61 moves, and an actual detection value of a pressure detection device for successively detecting pressure that is applied to the melted resin inside the injection chamber 65 by the injection plunger 61. The injection control section 423 compares those detection values with pre-set molding conditions or the like, and gives a command to operate according to the pre-set molding conditions or operation procedures to control the injection driving device 64. With regard to the position detection device, a linear scale 68 as shown in FIG. 3 or the like may be used, or the position may be calculated from a rotational speed detected by a rotary encoder if the injection driving device 64 is a motor. The actual value of the speed can be obtained in a way of, for example, converting position information that is successively detected by the position detection device to speed information with reference to a reference clock of the processing device. In addition, with regard to the pressure detection device, a load cell 67 may be used between a rear end of the injection plunger 61 and a front end of the driving rod of the injection driving device 64 as shown in FIG. 3, pressure of an oil chamber on a side where the injection plunger 61 is moved forward may be detected if the injection driving device 64 is a hydraulic cylinder, or the pressure may be calculated from an input current or rotation torque of the motor detected by a current measuring instrument or a torque measuring instrument if the injection driving device 64 is a motor.

In addition, the injection control section 423 performs a control to drive the rotary driving device 52 to rotate the plastication screw 51 in the normal rotation direction CW or the reverse rotation direction CCW.

The molding control section 421 controls the clamping driving device 14 of the clamping device 2 by the clamping control section 422 to perform mold closing and clamping, and controls various driving devices 52, 53, and 64 by the injection control section 423 to perform injection, pressure keeping, and plasticization metering. Finally, the molded product is removed when the clamping of the mold 20 attached to the clamping device 2 is released and the mold is opened by the clamping control section 422.

In the operating panel unit 40, an operating panel equipped with a display device, a keyboard, or various buttons is disposed, and various settings for molding conditions and the like are possible. At least the amount of time of a forward movement performed by the injection plunger 61 in a pushing-back step described later and the repeat times of a metering step and the pushing-back step can be set.

(1.3. Molding Cycle of Injection Molding Machine 1)

Figure 6:
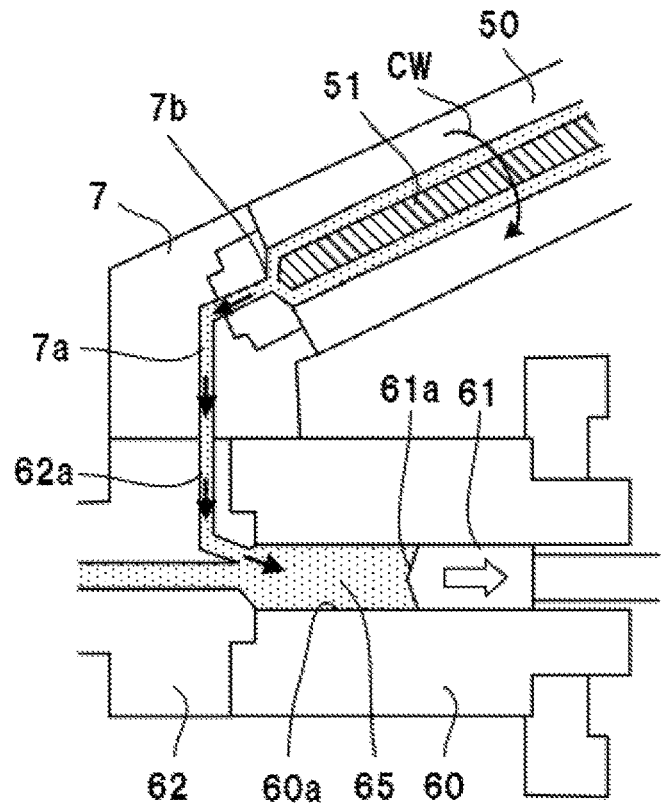
FIG. 6 is an illustrative diagram (a first illustrative diagram) for illustrating an operation of the injection device 3 in a plasticization metering step of the embodiment.
Figure 7:
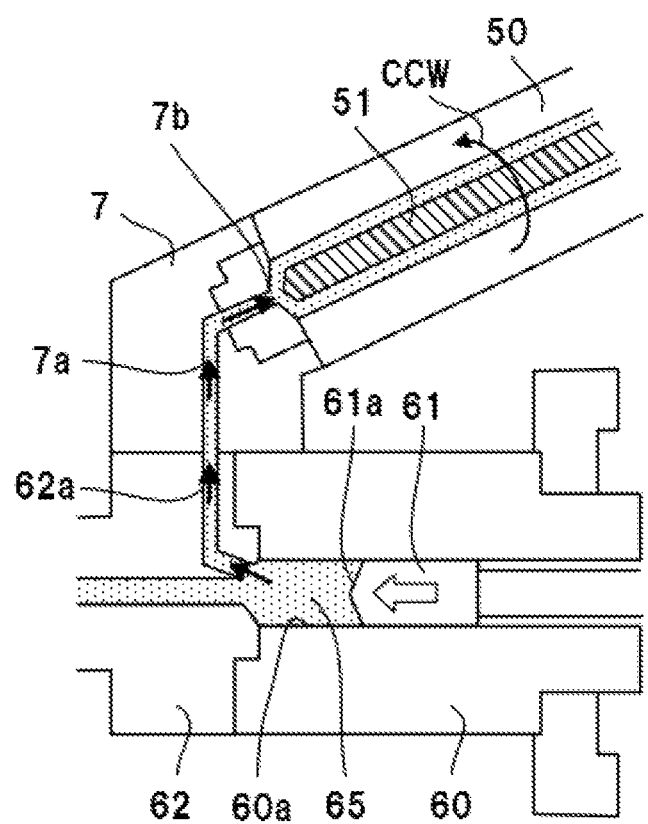
FIG. 7 is an illustrative diagram (a second illustrative diagram) for illustrating the operation of the injection device 3 in the plasticization metering step of the embodiment.
Figure 8:
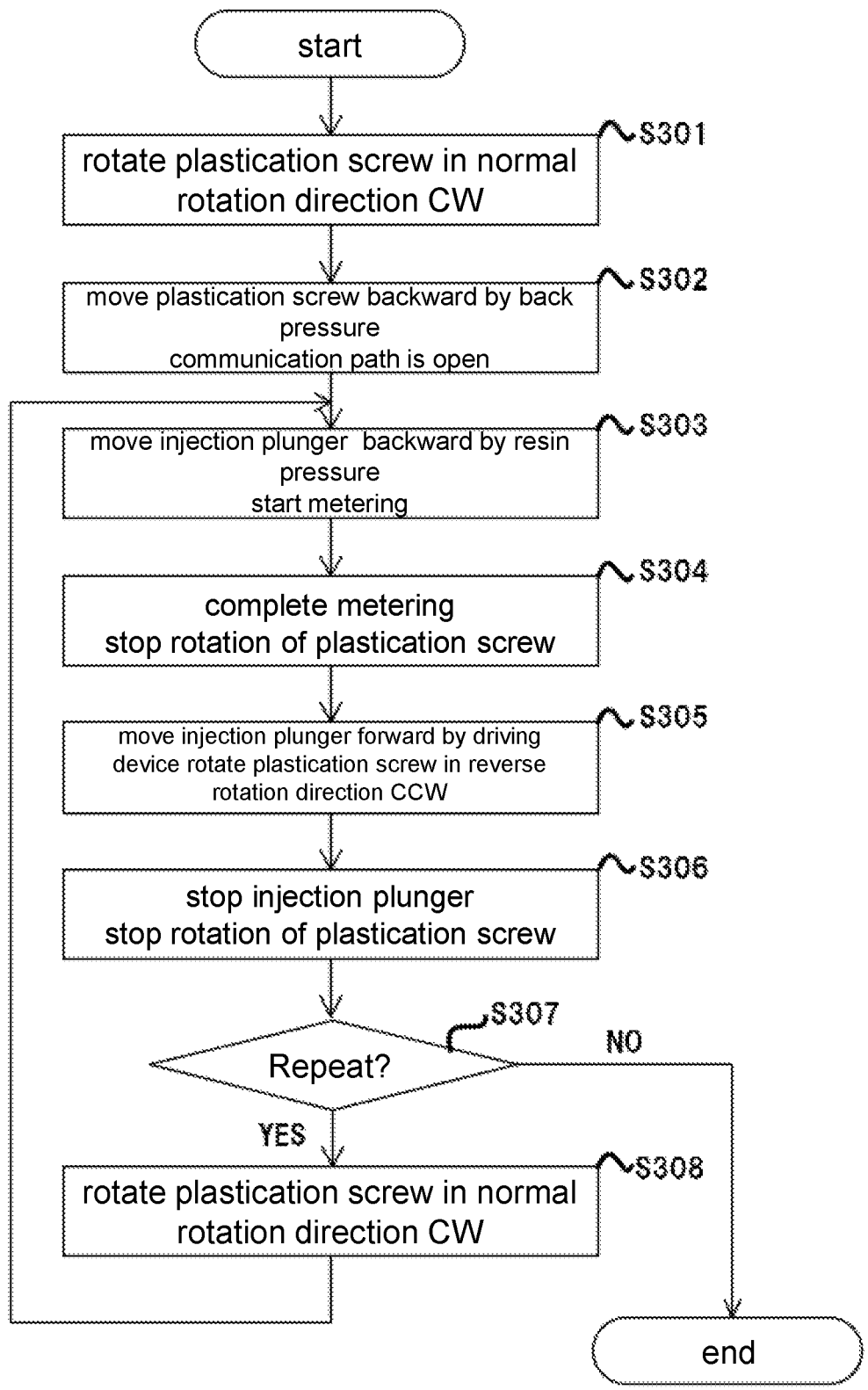
FIG. 8 is a flow diagram showing a flow of the plasticization metering step of the embodiment.

FIG. 6 is an illustrative diagram (a first illustrative diagram) for illustrating the operation of the injection device 3 in the plasticization metering step of the embodiment, and FIG. 7 is an illustrative diagram (a second illustrative diagram) for illustrating the operation of the injection device 3 in the plasticization metering step of the embodiment. FIG. 8 is a flow diagram showing the flow of the plasticization metering step of the embodiment. In the embodiment, the molding cycle is repeatedly performed in an order of an injection step (S01), a pressure keeping step (S02), and the plasticization metering step (S03) using the injection molding machine 1 configured as described above. The plasticization metering step (S03) that is the technical feature of the disclosure is mainly described in the following descriptions.

In the plasticization metering step (S03), the resin material supplied from the hopper 8 at the beginning is plasticized and melted by the heating performed by the heaters 69 and the shearing heating generated by the plastication screw 51 rotated by the rotary driving device 52 in the normal rotation direction CW, and the resin material is extruded to the opening 7*b* of the communication path 7*a* (S301). The non-return driving device 53 allows the backward movement of the plastication screw 51 due to a back pressure acting on the extruded melted resin, and opens the opening 7*b* of the communication path 7*a* on the plastication cylinder 50 side (a plasticization step: S302, FIG. 6).

The melted resin passes through the communication paths 7*a* and 62*a* and is extruded into the injection chamber 65 by the rotation of the plastication screw 51 in the normal rotation direction CW, the injection plunger 61 is moved backward due to the back pressure of the melted resin along with the extrusion of the melted resin to the injection chamber 65, and the amount of the backward movement of the injection plunger 61 is detected by the position detection device such as the linear scale 68 or the like (S303).

Eventually, the rotation of the plastication screw 51 is stopped when the injection plunger 61 moves backward to a metering completion position (the metering step: S304).

Next, the injection plunger 61 is moved forward by the injection driving device 64 for a pre-set amount of time, and the plastication screw 51 is rotated in the reverse rotation direction CCW (the pushing-back step: S305). By the pressure from the injection plunger 61 and the rotation of the plastication screw 51 in the reverse rotation direction CCW, the melted resin inside the injection chamber 65 passes through the communication paths 62a and 7a from the inside of the injection chamber 65 and is pushed back into the plastication cylinder 50 from the opening 7b of the communication path 7a. At this time, the non-return driving device 53 allows the backward movement of the plastication screw 51 due to pressure acting on the melted resin that is pushed back, and the opening 7b of the communication path 7a on the plastication cylinder 50 side is in an opened state (FIG. 7). The plasticization melting of the melted resin is promoted by the movement from the inside of the injection chamber 65 to the plastication cylinder 50 via the communication paths 7a and 62a, the heating performed by the heaters 69, and the shearing heating generated by the plastication screw 51 rotating in the reverse rotation direction CCW.

Then, the injection driving device 64 stops the forward movement operation of the injection plunger 61, the rotary driving device 52 stops the rotation of the plastication screw 51 (S306), and the plastication screw 51 is rotated in the normal rotation direction CW this time (S308). The melted resin is further plasticized and melted by the shearing heating generated by the plastication screw 51 and the heating that the heaters 69 perform, and passes through the communication paths 7a and 62a and is extruded into the injection chamber 65 by the rotation of the plastication screw 51 in the normal rotation direction CW. The injection plunger 61 moves backward due to the back pressure of the melted resin, and the amount of the backward movement of the injection plunger 61 is detected by the position detection device such as the linear scale 68 or the like. Eventually, the rotation of the plastication screw 51 is stopped when the injection plunger 61 moves backward to the metering completion position (S303-S304).

The metering step and the pushing-back step are repeatedly performed for a pre-set number of times (S307).

In this way, in the plasticization metering step, the injection plunger 61 repeatedly moves forward and backward, and the plastication screw 51 alternately rotates in the normal rotation direction CW and the reverse rotation direction CCW. Thereby, the melted resin reciprocally moves from the inside of the injection chamber 65 to the plastication cylinder 50 and from the plastication cylinder 50 into the injection chamber 65, and plasticization melting is promoted by the shearing heating generated by the alternate rotation of the plastication screw 51.

Thus, even if a hard-to-mold resin is used, injection molding can be easily performed, and a plastic resin and a compounding agent can be uniformly mixed.

In the injection step (S01), the injection plunger 61 moves forward, and the melted resin is filled into the cavity space 21 inside the mold 20 from the injection nozzle 63. In a state in which a filling speed, for example, a forward movement speed of the injection plunger 61 is preferentially controlled according to a pre-set filling speed condition, the melted resin is filled into the cavity space 21 inside the mold 20. Moreover, before the filling, the non-return driving device 53 moves the plastication screw 51 forward and closes the opening of the communication path 7a on the plastication cylinder 50 side to prevent backflow, and performs sucking back for preventing drooling from the injection nozzle 63, that is, an operation of slightly moving the injection plunger 61 backward.

In the pressure keeping step thereafter (S02), for example, in a state in which a predetermined pressure applied by the injection plunger 61 to the melted resin is preferentially controlled, a melted resin is filling by an insufficient amount inside the mold 20, also including the amount of heat shrinkage along with the cooling of the melted resin filled in the mold 20. Furthermore, in the pressure keeping step, a pressure is applied to the melted resin inside the cavity space 21 until the melted resin of a gate part inside the mold 20 adjacent to the cavity space 21 is solidified, and thereby backflow is prevented.

2. Second Embodiment of the Disclosure

Figure 9:
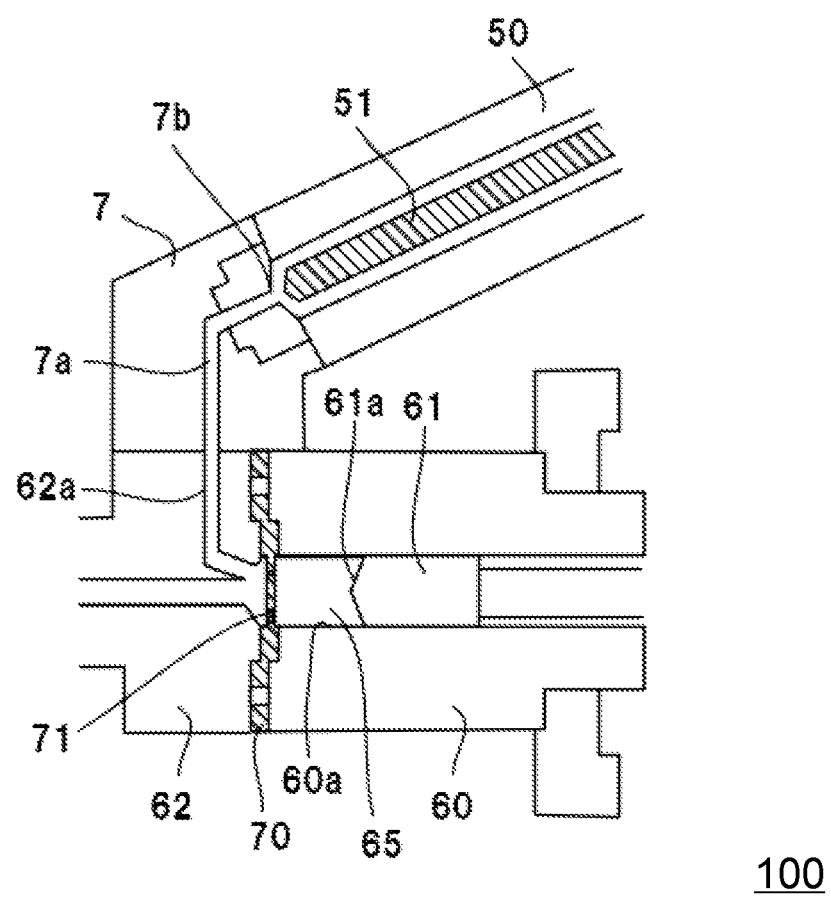
FIG. 9 is a schematic diagram showing a relevant part of an injection molding machine 100 in a second embodiment of the disclosure.
Figure 10:
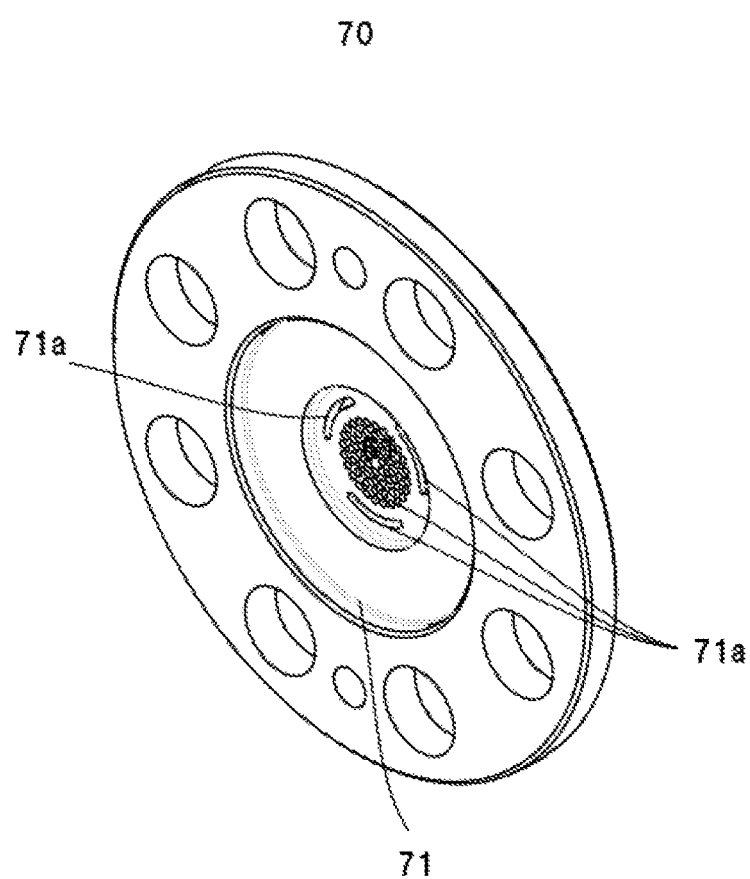
FIG. 10 is a perspective view showing a porous plate 70 of the embodiment.
Figure 11:
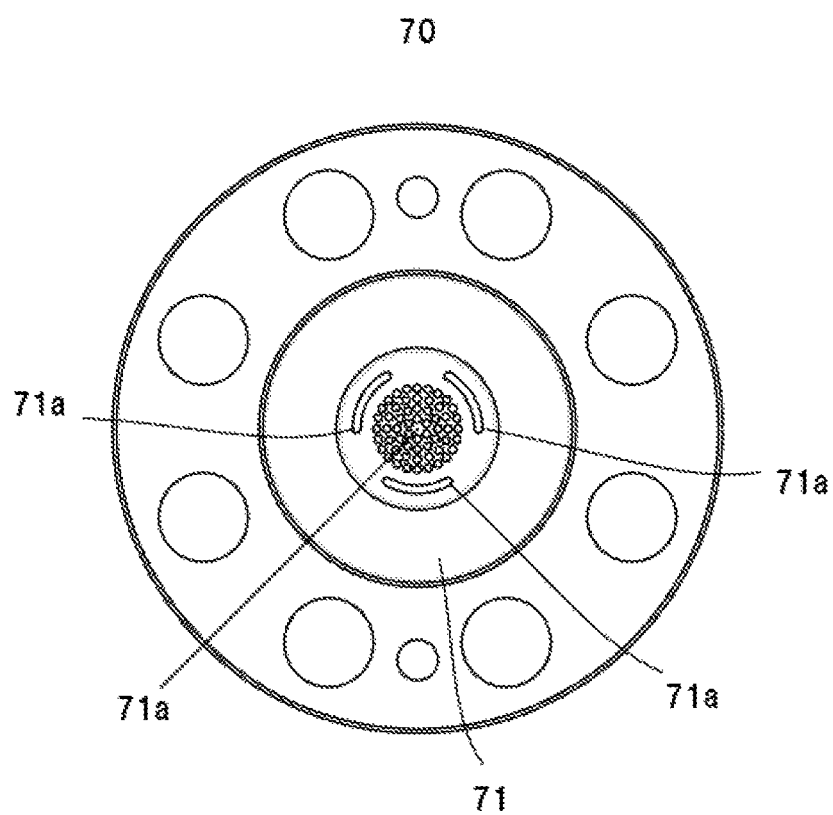
FIG. 11 is a plan view showing the porous plate 70 of the embodiment.

FIG. 9 is a schematic diagram showing a relevant part of an injection molding machine 100 in the second embodiment of the disclosure, and FIG. 10 is a perspective view showing a porous plate 70 of the embodiment. FIG. 11 is a plan view showing the porous plate 70 of the embodiment.

The injection molding machine 100 in the second embodiment of the disclosure is equipped with the porous plate 70 on the flow path of the melted resin in order to improve kneading property, and other configurations of the injection molding machine 100 are the same as those of the injection molding machine 1 of the first embodiment. Thus, elements having the same function and configuration are marked with the signs the same as those of the first embodiment, and descriptions thereof are omitted.

The porous plate 70 of the disclosure is a disk-shaped plate arranged on the flow path of the melted resin, and a number of pores 71a having predetermined diameters penetrating in a thickness direction are arranged in a center section 71. The porous plate 70 is arranged in a way of standing relative to a direction of the flow path of the melted resin to allow the melted resin to pass through the inside of the pores 71a. In the embodiment, the porous plate 70 is arranged between the injection cylinder 60 and the nozzle cylinder 62, that is, in a position which is on the flow path of the melted resin and does not interfere with the movement of the plastication screw 51 and the injection plunger 61 (FIG. 9).

The diameter, the shape, and the number of the pores 71a of the porous plate 70 can be appropriately set based on types of the target melted resin and the compounding agent to be mixed, and with regard to the shape of the pores 71a, various shapes such as a circular shape, an elliptical shape, a linear shape, and the like may be combined to use.

In the metering step, the melted resin passes through the plurality of pores 71a and flows into the injection chamber 65 from the plastication cylinder 50, and in the pushing-back step, the melted resin passes through the pores 71a and flows into the plastication cylinder 50 from the inside of the injection chamber 65. Because the melted resin moves passing through the plurality of pores 71a when reciprocally moving on the flow path in this way, the melted resin is dispersed, a turbulent flow is generated due to the porous plate 70, and the melted resin is stirred, which can further improve the kneading property.

In the embodiment, a screw preplasticating injection molding machine using a thermoplastic molding material is described above, but an injection device in which gas can be compressed and dissolved in the molding material, or a screw preplasticating injection device having a mixing section that mixes a thermosetting molding material and an additive by a mixing shaft or a static mixer can be applied.

The disclosure described above can be implemented in various other forms without departing from the spirit and essential features of the disclosure. Thus, examples described in the specification are illustrative, and are not supposed to be constructed as limited hereto.

What is claimed is:

1. An injection molding machine, comprising:
    a plasticizing unit which plasticizes a molding material inside a plastication cylinder by rotation of a screw;
    an injection unit which injects, into a mold, the molding material supplied into an injection chamber of an injection cylinder from the plasticizing unit; and
    an injection control section which controls operations of the plasticizing unit and the injection unit, wherein
    the plasticizing unit comprises a rotary driving device rotating the screw,
    the injection unit comprises a plunger reciprocally moving inside the injection chamber, and an injection driving device reciprocally moving the plunger, and
    the injection control section is configured to driving the injection driving device to move the plunger backward and forward inside the injection chamber and driving the rotary driving device to alternately rotate the screw in a normal clockwise or counter-clockwise rotation direction and a corresponding reverse counter-clockwise or clockwise rotation direction, and controlling the molding material to flow back-and-forth between the inside of the plastication cylinder and the injection chamber, and the injection control section is configured to
    driving the rotary driving device to rotate the screw in the normal clockwise or counter-clockwise rotation direction, extruding the molding material from the inside of the plastication cylinder into the injection chamber, moving the plunger backward, and stopping the plunger in a metering completion position; and
    driving the rotary driving device to rotate the screw in the reverse counter-clockwise or clockwise rotation direction, driving the injection driving device to move the plunger forward, and pushing back the molding material from the inside of the injection chamber into the plastication cylinder.

2. The injection molding machine according to claim 1, wherein the injection control section performs, for a plurality of cycles, the rotation of the screw in the normal rotation direction and the reverse rotation direction and a backward movement and a forward movement of the plunger.

3. The injection molding machine according to claim 1, wherein a porous plate is arranged on the flow path.

4. An injection molding method of an injection molding machine, wherein the injection molding machine comprises:
    a plasticizing unit which plasticizes a molding material inside a plastication cylinder by the rotation of a screw, and an injection unit comprising a plunger which reciprocally moves inside an injection chamber,
    the injection molding method of the injection molding machine performs: a metering step in which the screw is rotated in a normal clockwise or counter-clockwise rotation direction, the molding material is extruded from the plastication cylinder into the injection chamber, the plunger is moved backward, and then the plunger is stopped in a metering completion position; and
    a pushing-back step in which after the metering step, the screw is rotated in a corresponding reverse counter-clockwise or clockwise rotation direction, the plunger is moved forward, and the molding material is extruded from the inside of the injection chamber to the plastication cylinder.

5. The injection molding method of the injection molding machine according to claim 4, wherein the metering step and the pushing-back step are performed for a plurality of cycles.

6. The injection molding machine according to claim 1, further comprising:
    an operation panel configured to set a number of times that the molding material reciprocates on a flow path from the inside of the plastication cylinder into the injection chamber.

* * * * *